United States Patent
Srikantam et al.

(10) Patent No.: US 10,686,859 B2
(45) Date of Patent: Jun. 16, 2020

(54) CONTENT SCENARIO AND NETWORK CONDITION BASED MULTIMEDIA COMMUNICATION

(71) Applicant: Intel Corporation, Santa Clara, CA (US)

(72) Inventors: Sri Ranjan Srikantam, Hillsboro, OR (US); Prasanna Kumar Mandapadi Ramasubramanian, Hillsboro, OR (US); Khanh V. Nguyen, Happy Valley, OR (US); Linda S. Cline, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 218 days.

(21) Appl. No.: 15/856,768

(22) Filed: Dec. 28, 2017

(65) Prior Publication Data
US 2019/0044991 A1 Feb. 7, 2019

(51) Int. Cl.
| | |
|---|---|
| G06F 15/16 | (2006.01) |
| H04L 29/06 | (2006.01) |
| H04N 7/15 | (2006.01) |
| H04L 12/26 | (2006.01) |
| H04N 7/14 | (2006.01) |

(52) U.S. Cl.
CPC .......... *H04L 65/607* (2013.01); *H04L 65/403* (2013.01); *H04L 65/4092* (2013.01); *H04L 65/608* (2013.01); *H04L 65/80* (2013.01); *H04L 43/0882* (2013.01); *H04N 7/147* (2013.01); *H04N 7/15* (2013.01)

(58) Field of Classification Search
None
See application file for complete search history.

(56) References Cited

U.S. PATENT DOCUMENTS

| | | | |
|---|---|---|---|
| 9,253,229 B1* | 2/2016 | Strothmann | H04N 21/2662 |
| 9,391,909 B2 | 7/2016 | Azogui et al. | |
| 10,121,337 B2* | 11/2018 | Yuan | G08B 13/19682 |
| 10,187,649 B2* | 1/2019 | Tong | H04N 19/103 |
| 2003/0206558 A1* | 11/2003 | Parkkinen | G10L 19/24 |
| | | | 370/477 |
| 2013/0113874 A1* | 5/2013 | Fang | H04N 19/188 |
| | | | 348/14.08 |

* cited by examiner

*Primary Examiner* — Yves Dalencourt
(74) *Attorney, Agent, or Firm* — Schwabe, Williamson & Wyatt, P.C.

(57) ABSTRACT

Embodiments include apparatuses, methods, and systems including a content scenario detection unit and a rate adjustment unit for the communication of a multimedia content. The multimedia content may include a low bitrate scenario and a high bitrate scenario. The content scenario detection unit may detect the low bitrate scenario of the multimedia content for a multimedia traffic when a transmitter is to generate a first window of one or more frames of the low bitrate scenario during a first time period at a first encoding rate. The rate adjustment unit may determine, based at least in part on the detection of the low bitrate scenario, a second encoding rate different from the first encoding rate. The transmitter may generate at the second encoding rate a second window of one or more frames of the low bitrate scenario during a second time period. Other embodiments may also be described and claimed.

25 Claims, 8 Drawing Sheets

CONTENT SCENARIO AND NETWORK CONDITION BASED MULTIMEDIA COMMUNICATION

FIELD

Embodiments of the present invention relate generally to the technical field of communication, and more particularly to multimedia communication.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A multimedia content may be a content that may include a combination of different content forms such as text, audio, graphics, images, animations, still images, video and interactive content. Multimedia may be recorded, played, displayed, and interacted with or accessed by information content processing devices, such as computerized and electronic devices. Multimedia communication may deal with the transfer, the protocols, services and mechanisms of discrete media data, e.g., text and graphics, or continuous media data, e.g., audio and video, in or over computer or communication networks.

Multimedia communication has many applications, e.g., video conferencing or screen sharing among different users with different devices. Video conferencing may transmit a video captured by a camera to other devices in a conferencing session. Screen sharing between multiple devices may capture a desktop of a computer device and transmit the captured desktop to other devices for viewing. Current multimedia communication techniques based on network congestion parameters may fail to support multimedia communication applications, e.g., video conferencing or screen sharing, to the capacity of the network may be able to afford. Improvements to multimedia communication techniques to better support multimedia communication applications, e.g., video conferencing, screen sharing, or other applications, may be desirable.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
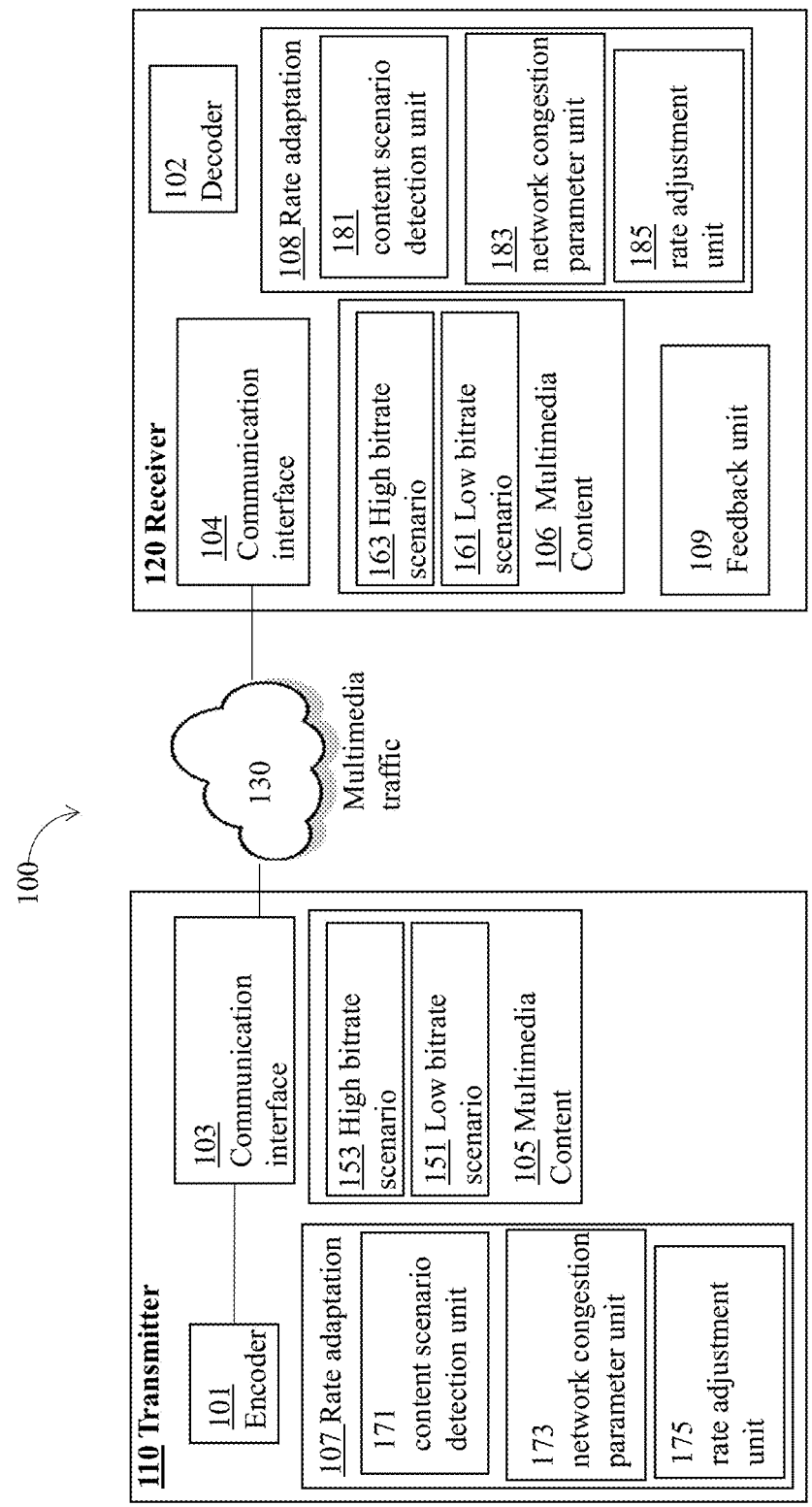
FIG. 1 illustrates an example schematic block diagram of a communication system including a transmitter and a receiver having a rate adjustment unit to determine an encoding rate for a multimedia traffic based on content scenario, in accordance with various embodiments.

When a multimedia communication is established between two computing or communication devices, a first encoding rate may be negotiated based on conditions of a communication network connecting the two devices. However, conditions of the communication network may change over time. For example, a communication network may become more or less congested, while more or fewer packets of the multimedia traffic may be lost. Hence, in embodiments, rate adaptation techniques are advantageously employed to change the first encoding rate to a second encoding rate different from the first encoding rate, to better accommodate the changing network conditions.

On the other hand, a multimedia content may vary significantly from one segment, scene, or content scenario to another. For example, a desktop of a computing device being shared and transmitted may not be updated continuously. When a desktop is not updated, it may become a low bitrate scenario for the screen sharing, since the scenes being shared may generate low number of frames or bits to be transmitted. Similarly, a low bitrate scenario may refer to static scenes in video conferencing that may result in low number of frames or bits to be transmitted.

Current rate adaptation techniques for multimedia communication based on network congestion parameters may fail to take into consideration of the significant differences between different content scenarios or segments of a multimedia content. For example, a low bitrate scenario, e.g., not updated screen in screen sharing, or static scenes in video conferencing, may generate a low number of bits to be transmitted, which may lead to a low receiving bitrate for a receiver. When a receiver may have a low receiving bitrate, current rate adaptation techniques for multimedia communication may mistakenly assume network congestions may have happened, and may further reduce the encoding rate for the transmitter to combat the wrongly assumed network congestions.

Embodiments herein may present rate adaptation techniques and mechanisms for multimedia communication, which may take into considerations of the differences between segments, scenes, or content scenarios of a multimedia content. A low bitrate scenario of a multimedia content for a multimedia traffic generated at a first encoding rate may be detected by a content scenario detection unit, and a rate adjustment unit may determine a second encoding rate different from the first encoding rate for the transmitter, based at least in part on the detection of the low bitrate scenario, and one or more network congestion parameters. For example, a rate adjustment unit may determine to increase the encoding rate when a receiver may have a low receiving bitrate, while a network efficiency may be high, and/or the packet loss rate may be low.

In embodiments, an apparatus for multimedia communication may include a content scenario detection unit and a rate adjustment unit coupled to the content scenario detection unit for the communication of a multimedia content. The multimedia content may include a low bitrate scenario represented by a first number of bits, and a high bitrate scenario represented by a second number of bits larger than the first number of bits. The content scenario detection unit may detect the low bitrate scenario of the multimedia content for a multimedia traffic when a transmitter is to generate a first window of one or more frames of the low bitrate scenario during a first time period at a first encoding rate. The rate adjustment unit may determine, based at least in part on the detection of the low bitrate scenario, and one or more network congestion parameters, a second encoding rate different from the first encoding rate. The transmitter may generate at the second encoding rate a second window of one or more frames of the low bitrate scenario during a second time period to follow the first time period.

In embodiments, an apparatus for multimedia communication may include a content scenario detection unit, a rate adjustment unit coupled to the content scenario detection unit, and an encoding unit coupled to the rate adjustment unit for the communication of a multimedia content. The multimedia content may include a low bitrate scenario represented by a first number of bits, and a high bitrate scenario represented by a second number of bits larger than the first number of bits. The content scenario detection unit may detect the low bitrate scenario of the multimedia content for a multimedia traffic when a transmitter is to generate a first window of one or more frames of the low bitrate scenario during a first time period at a first encoding rate. The rate adjustment unit may determine, based at least in part on the detection of the low bitrate scenario, and one or more network congestion parameters, a second encoding rate different from the first encoding rate. The encoding unit may generate at the second encoding rate a second window of one or more frames of the low bitrate scenario during a second time period to follow the first time period.

In embodiments, an apparatus for multimedia communication may include a content scenario detection unit, a network congestion parameter unit, a rate adjustment unit, and a feedback unit coupled to the rate adjustment unit for the communication of a multimedia content. The multimedia content may include a low bitrate scenario represented by a first number of bits, and a high bitrate scenario represented by a second number of bits larger than the first number of bits. The content scenario detection unit may detect the low bitrate scenario of the multimedia content for a multimedia traffic when a transmitter is to generate a first window of one or more frames of the low bitrate scenario during a first time period at a first encoding rate. The network congestion parameter unit may detect one or more network congestion parameters for the first window of one or more frames or during the first time period. The rate adjustment unit may determine, based at least in part on the detection of the low bitrate scenario, and the one or more network congestion parameters, a second encoding rate different from the first encoding rate. The feedback unit may provide the second encoding rate to the transmitter, wherein the transmitter may generate at the second encoding rate a second window of one or more frames of the low bitrate scenario during a second time period to follow the first time period.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "unit," "engine," "module," or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

As used herein, the term "interface" or "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

Some embodiments may be used in conjunction with various devices and systems, for example, a communication system, a communication device, a wireless communication system, a wireless communication device, a wired communication device, a wired communication system, a personal computer (PC), a desktop computer, a mobile computer, a laptop computer, a notebook computer, an Ultrabook™ computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wired or wireless modem, a video device, an audio device, an audio-video (AN) device, a wired or wireless network, a wireless area network, a wireless video area network (WVAN), a local area network (LAN), a wireless LAN (WLAN), a personal area network (PAN), a wireless PAN (WPAN), a wireless wide area network (WWAN), and the like.

Some embodiments may be used in conjunction with devices and/or networks operating in accordance with existing web real-time communication standards, IEEE 802.11 standards, wireless-gigabit-alliance (WGA) specifications, wireless fidelity (WiFi) alliance (WFA) peer-to-peer (P2P) specifications, 3rd generation partnership project (3GPP), 3GPP long term evolution (LTE), any current and/or future versions and/or derivatives thereof, and the like.

Some embodiments may be used in conjunction with one way and/or two-way radio communication systems, cellular radio-telephone communication systems, a mobile phone, a cellular telephone, a wireless telephone, a personal communication systems (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation, discrete multi-tone (DMT), Bluetooth®, global positioning system (GPS), Wi-Fi, Wi-Max, ZigBee™, ultra-wideband (UWB), global system for mobile communication (GSM), 2G, 2.5G, 3G, 3.5G, 4G, fifth generation (5G) mobile networks, 3GPP, long term evolution (LTE), LTE advanced, enhanced data rates for GSM evolution (EDGE), or the like. Other embodiments may be used in various other wired and/or wireless devices, systems and/or networks.

The term "wireless device," as used herein, includes, for example, a device capable of wireless communication, a communication device capable of wireless communication, a communication station capable of wireless communication, a portable or non-portable device capable of wireless communication, or the like. In some embodiments, a wireless device may be or may include a peripheral that is integrated with a computer, or a peripheral that is attached to a computer. In some embodiments, the term "wireless device" may optionally include a wireless service.

The term "communication device", as used herein, includes, for example, a device capable of wireless and/or wired communication, a communication device capable of wireless and/or wired communication, a communication station capable of wireless and/or wired communication, a portable or non-portable device capable of wireless and/or wired communication, or the like. In some embodiments, a communication device may be or may include a peripheral that is integrated with a computer, or a peripheral that is attached to a computer.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to an action of receiving the signal by a first device, and may not necessarily include the action of transmitting the signal by a second device.

FIG. 1 illustrates an example schematic block diagram of a communication system 100 including a transmitter 110 and a receiver 120 having a rate adjustment unit 175 or a rate adjustment unit 185 to determine an encoding rate for a multimedia traffic based on content scenario, in accordance with various embodiments. For clarity, features of the communication system 100, the transmitter 110, the receiver 120, the rate adjustment unit 175 or the rate adjustment unit 185 may be described below as an example for understanding an example communication system including a transmitter and a receiver having a rate adjustment unit to determine an encoding rate for a multimedia traffic based on content scenario. It is to be understood that there may be more or fewer components included in the communication system 100, the transmitter 110, the receiver 120, the rate adjustment unit 175 or the rate adjustment unit 185. Further, it is to be understood that one or more of the devices and components within the communication system 100, the transmitter 110, the receiver 120, the rate adjustment unit 175 or the rate adjustment unit 185 may include additional and/or varying features from the description below, and may include any devices and components that one having ordinary skill in the art would consider and/or refer to as the devices and components of a communication system including a transmitter and a receiver having a rate adjustment unit to determine an encoding rate for a multimedia traffic based on content scenario.

In embodiments, the communication system 100 may include the transmitter 110 and the receiver 120 communicating through a communication network 130. The transmitter 110 may include an encoder 101, a communication interface 103, a multimedia content 105, and a rate adaptation unit 107. The receiver 120 may include a decoder 102, a communication interface 104, a multimedia content 106, a rate adaptation unit 108, and a feedback unit 109. The multimedia content 105 may be a multimedia content to be transmitted by the transmitter 110, while the multimedia content 106 may be a multimedia content received by the receiver 120. The multimedia content 105 may include a low bitrate scenario 151 and a high bitrate scenario 153. Similarly, the multimedia content 106 may include a low bitrate scenario 161 and a high bitrate scenario 163. The rate adaptation unit 107 and the rate adaptation unit 108 may implement same or similar functions, and may work together to perform tasks outlined in the current specification. In detail, the rate adaptation unit 107 may include a content scenario detection unit 171, a network congestion parameter unit 173, and the rate adjustment unit 175. Similarly, the rate adaptation unit 108 may include a content scenario detection unit 181, a network congestion parameter unit 183, and the rate adjustment unit 185.

In embodiments, when a communication between the transmitter 110 and the receiver 120 may be established, a first encoding rate may be determined for a multimedia traffic between them. Hence, a section, or a segment, of the multimedia content 105, e.g., the low bitrate scenario 151 or the high bitrate scenario 153, may be encoded by the encoder 101 at the first encoding rate to generate a first window of one or more frames during a first time period. The first window of one or more frames may be transmitted by the communication interface 103, through the communication network 130, to be received by the communication interface 104. Afterwards, the decoder 102 may decode the received multimedia content 106 to render the decoded multimedia data.

In embodiments, the content scenario detection unit 181 may detect a low bitrate scenario, e.g., the low bitrate scenario 161, of the multimedia content 106 received by the receiver 120, from the first window of one or more frames generated at the first encoding rate by the transmitter 110 during the first time period. In addition, the network congestion parameter unit 183 may detect one or more network congestion parameters for the first window of one or more frames generated at the first encoding rate by the transmitter 110 during the first time period. Furthermore, the rate adjustment unit 185 may determine, based at least in part on the detection of the low bitrate scenario 161, and one or more network congestion parameters, a second encoding rate different from the first encoding rate. Afterwards, the feedback unit 109 may provide the second encoding rate to the transmitter 110. The transmitter, e.g., the encoder 101, may generate at the second encoding rate a second window of one or more frames of the low bitrate scenario during a second time period to follow the first time period. The detection of a low bitrate scenario is only used as an example and is not limiting. For example, the content scenario detection unit 181 may detect a high bitrate scenario, and the rate adjustment unit 185 may determine a second encoding rate adjusted for the high bitrate scenario.

Alternatively, in embodiments, the content scenario detection unit 171 may detect a low bitrate scenario, e.g., the low bitrate scenario 151, of the multimedia content 105, based on a first window of one or more frames generated at the first encoding rate by the encoder 101 during the first time period. In addition, the network congestion parameter unit 173 may detect one or more network congestion parameters for the first window of one or more frames generated at the first encoding rate by the transmitter 110 during the first time period. Furthermore, the rate adjustment unit 175 may determine, based at least in part on the detection of the low bitrate scenario 151, and one or more network congestion parameters, a second encoding rate different from the first encoding rate. Afterwards, the encoder 101 may generate at the second encoding rate a second window of one or more frames of the low bitrate scenario during a second time period to follow the first time period. The detection of a low bitrate scenario is only used as an example and is not limiting. For example, the content scenario detection unit 171 may detect a high bitrate scenario, and the rate adjustment unit 175 may determine a second encoding rate adjusted for the high bitrate scenario.

In embodiments, the low bitrate scenario 151 or the low bitrate scenario 161 may be represented by a first number of bits or a first bitrate, while the high bitrate scenario 153 or the high bitrate scenario 163 may be represented by a second number of bits larger than the first number of bits, or by a second bitrate larger than the first bitrate. The low bitrate scenario 151 or the low bitrate scenario 161 may be a section of the multimedia content 105 or the multimedia content 106 that may include one or more scenes with frames of low quality, a low framerate, or a low number of movement in the one or more scenes. On the other hand, the high bitrate scenario 153 or the high bitrate scenario 163 may be a section of the multimedia content 105 or the multimedia content 106 that may include one or more scenes with frames of a quality higher than the low quality, a framerate higher than the low framerate, or a number of movement higher than the low number of movement. For example, the low bitrate scenario 151 or the low bitrate scenario 161 may be a section of the multimedia content that includes one or more scenes represented or encoded by a low bitrate, e.g., 8-32 kbps, 500 kbps. On the other hand, the high bitrate scenario 153 or the high bitrate scenario 163 may be a section of the multimedia content that includes one or more scenes represented or encoded by a high bitrate, e.g., 3.3 Mbps, 5.5 Mbps, or 11 Mbps.

Additionally and alternatively, the multimedia content 105 or the multimedia content 106 may include more than two kinds of content scenarios. For example, the multimedia content 105 or the multimedia content 106 may include a low bitrate scenario, a high bitrate scenario, and a medium bitrate scenario, not shown.

In embodiments, the content scenario detection unit 181 or the content scenario detection unit 171 may detect a low bitrate scenario, e.g., the low bitrate scenario 151 or the low bitrate scenario 161, of a multimedia content, e.g., the multimedia content 105 or the multimedia content 106, for a multimedia traffic based on a transmitter bitrate of the transmitter 110 and a network efficiency. A transmitter bitrate may measure a bitrate of the multimedia traffic transmitted by the transmitter 110 for the first window of one or more frames, or during the first time period. A network efficiency may be defined as a ratio between a receiving bitrate and the transmitter bitrate, where the receiving bitrate is to measure a bitrate received by the receiver 120 during the first window of one or more frames or during the first time period.

In embodiments, the network congestion parameter unit 183 or the network congestion parameter unit 173 may detect one or more network congestion parameters for the first window of one or more frames or during the first time period. For example, the one or more network congestion parameters may include a throughput, a goodput, a number of lost packets, a packet delay, or a packet loss rate (PLR) of the multimedia traffic for the first window of one or more frames, or during the first time period. In embodiments, a goodput may be used to measure an application layer latency bound.

In embodiments, the rate adjustment unit 185 or the rate adjustment unit 175 may determine, based at least in part on the detection of the low bitrate scenario, and one or more network congestion parameters, a second encoding rate different from the first encoding rate. For example, the rate adjustment unit 185 or the rate adjustment unit 175 may determine to decrease the first encoding rate to obtain the second encoding rate. Additionally and alternatively, the rate adjustment unit 185 or the rate adjustment unit 175 may determine to increase the first encoding rate to obtain the second encoding rate.

In embodiments, a difference between the first encoding rate and the second encoding rate may be a multiple of a predetermined rate adjustment step value. For example, a predetermined rate adjustment step value may be calculated based on a maximum encoding rate that may be allowed by the communication system 100. In embodiments, a predetermined rate adjustment step value may equal to a maximum encoding rate (Max_Rate) divided by a constant, e.g., 1000. A difference between the first encoding rate and the second encoding rate may be a multiple of (Max_Rate/1000), e.g., the second encoding rate=the first encoding rate+N*(Max_Rate/1000), or the second encoding rate=the first encoding rate−N*(Max_Rate/1000). In some other embodiments, a difference between the first encoding rate and the second encoding rate may be any number instead of a multiple of a predetermined rate adjustment step value.

In embodiments, the encoder 101 or the decoder 102 may include a video encoder/decoder, a video codec, or any other encoder/decoder to encode/decode any other type of data, e.g., audio data, and the like. A video codec may be an electronic circuit or software that compresses or decompresses digital video. It may convert raw (uncompressed) digital video to a compressed format or vice versa, according to some standard video compression specification. For example, the encoder 101 or the decoder 102 may conform to one or more standards of H.265/MPEG-H, HEVC codecs, H.264/MPEG-4 AVC codecs, H.263/MPEG-4 Part 2 codecs, H.262/MPEG-2 codecs, Microsoft codecs, Google (On2) codecs, or other codec for video, audio, or multimedia contents.

In embodiments, the communication network 130 may include one or more wireless communication networks, one or more wired communication networks, and/or any combination of one or more wireless communication networks and/or one or more wired communication networks, e.g., as described below.

Figure 2:
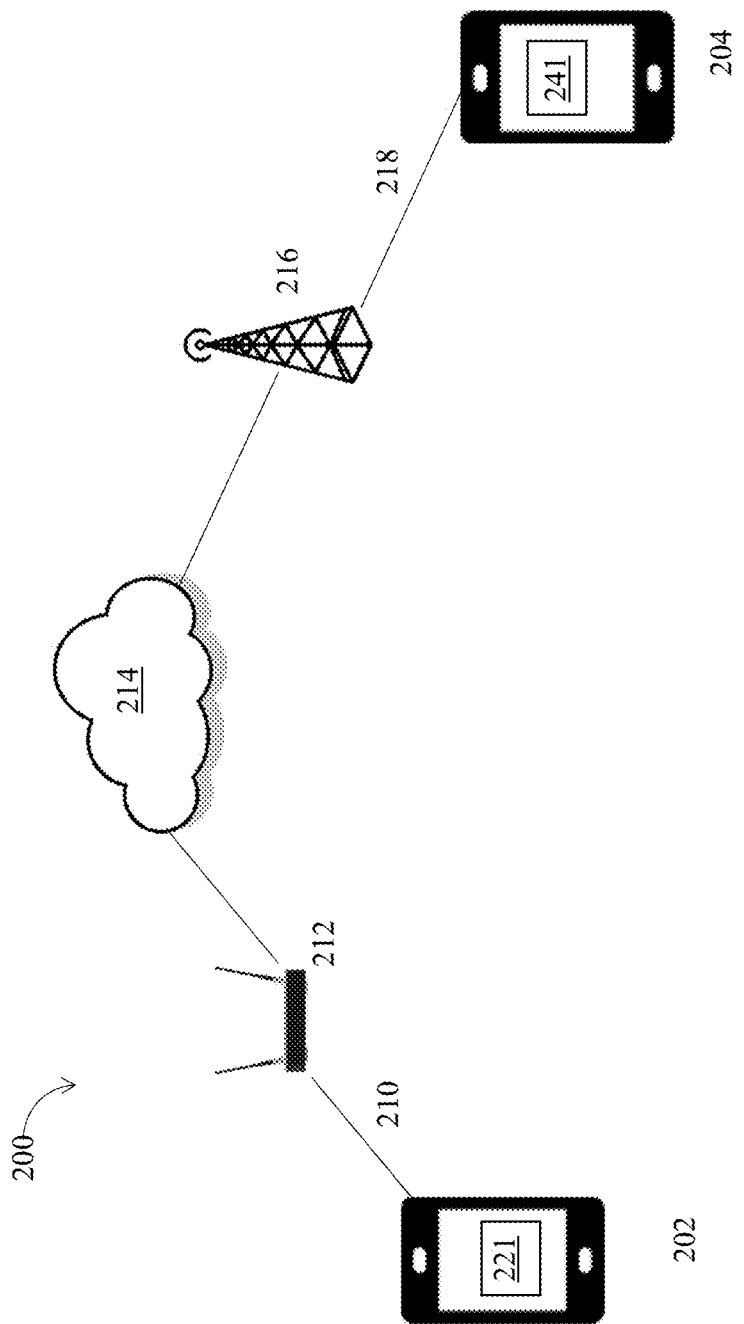
FIG. 2 illustrates another example schematic diagram of a communication system including a first communication device and a second communication device having a rate adjustment unit to determine an encoding rate for a multimedia traffic based on content scenario, in accordance with various embodiments.

FIG. 2 illustrates another example schematic diagram of a communication system 200 including a first communication device, e.g., a device 202, and a second communication device, a device 204, having a rate adjustment unit, e.g., a rate adjustment unit 221 or a rate adjustment unit 241, to determine an encoding rate for a multimedia traffic based on content scenario, in accordance with various embodiments. The system 200 may be an example of the system 100 shown in FIG. 1. The device 202 or the device 204 may act as a transmitter or a receiver at different time. For example, the device 202, the rate adjustment unit 221, the device 204, and the rate adjustment unit 241 may be examples of the transmitter 110, the rate adjustment unit 175, the receiver 120, and the rate adjustment unit 185, respectively, as shown in FIG. 1. Similarly, the device 204, the rate adjustment unit 241, the device 202, and the rate adjustment unit 221 may be examples of the transmitter 110, the rate adjustment unit 175, the receiver 120, and the rate adjustment unit 185, respectively, as shown in FIG. 1.

In embodiments, the device 202 and the device 204 may be mobile device. The device 202 may communicate with a WLAN router 212 via a WLAN link 210, e.g., a WiFi link. The device 204 may communicate with a WWAN node 216, via a WWAN link 218, e.g., a cellular link. WLAN router 212 may communicate with WWAN router 216 via a communication infrastructure 214, e.g., including a plurality of Internet routers. The WLAN router 212, the WWAN node 216, and the communication infrastructure 214 together may be an example of the communication network 130 shown in FIG. 1.

In embodiments, the device 202 and the device 204 may include a wireless communication unit. The wireless communication unit may include at least one radio including, one or more wireless transmitters, receivers and/or transceivers able to send and/or receive wireless communication signals, RF signals, frames, blocks, transmission streams, packets, messages, data items, and/or data. For example, the device 202 and the device 204 may include a wireless Network Interface Card (NIC), and the like. In embodiments, the device 202 and the device 204 may include, or may be associated with, one or more antennas. Antennas included in the device 202 and the device 204 may include any type of antennas suitable for transmitting and/or receiving wireless communication signals, blocks, frames, transmission streams, packets, messages and/or data.

In some embodiments, the device 202 and the device 204 may include a wired communication unit, for example, a modulator-demodulator (modem) capable of sending and/or receiving communication signals, frames, blocks, transmission streams, packets, messages, data items, and/or data, over one or more wired links.

In embodiments, the device 202 and the device 204 may be a wireless communication device, a wired communication device, a personal computer (PC), a desktop computer, a mobile computer, a laptop computer, a notebook computer, an Ultrabook™ computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wearable device, a head mount device, a video device, an audio device, or an audio-video (A/V) device.

In embodiments, the device 202 and the device 204 may exchange video data. For example, a video conferencing call may be set up between the device 202 and the device 204. The video conferencing call may be set up using a negotiated encoding rate, which may be determined, for example, based on conditions of links 210, 218 and/or infrastructure 214, when setting up the video conference call. An available bandwidth for communicating the video data between the device 202 and the device 204 may vary, for example, based on variations in congestion and/or other conditions of the communication network between the device 202 and the device 204.

Figure 3:
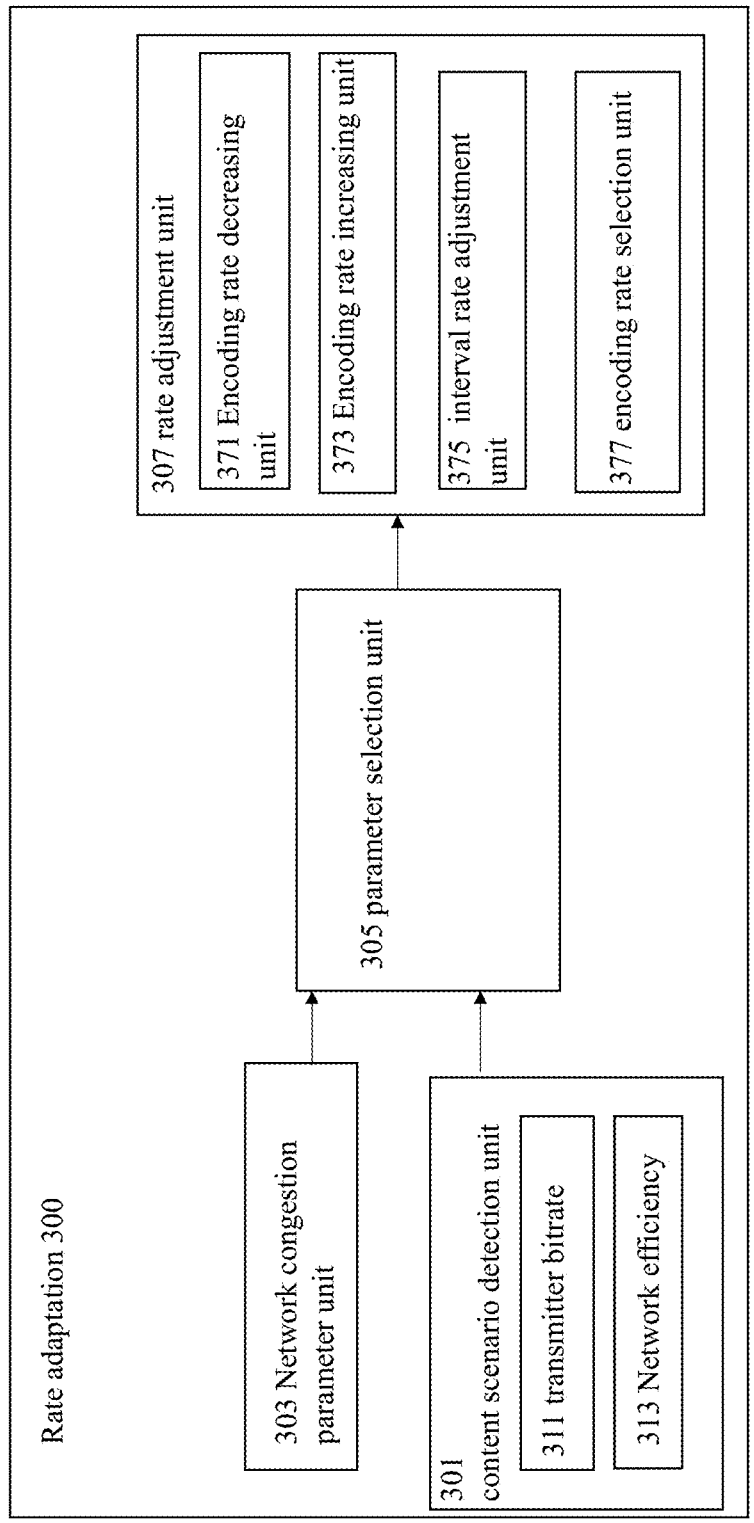
FIG. 3 illustrates an example schematic block diagram of an apparatus for multimedia communication including a rate adjustment unit to determine an encoding rate for a multimedia traffic based on content scenario, in accordance with various embodiments.

FIG. 3 illustrates an example schematic block diagram of an apparatus 300 for multimedia communication including a rate adjustment unit 307 to determine an encoding rate for a multimedia traffic based on content scenario, in accordance with various embodiments. The apparatus 300 and the rate adjustment unit 307 may be an example of the rate adaptation unit 107 and the rate adjustment unit 175, or the rate adaptation unit 108 and the rate adjustment unit 185, as shown in FIG. 1. In some embodiments, some of the functions of the apparatus 300 may be implemented in the rate adaptation unit 107 and some other functions of the apparatus 300 may be implemented in the rate adaptation unit 108.

In embodiments, the apparatus 300 may include a content scenario detection unit 301, a network congestion parameter unit 303, a parameter selection unit 305, and the rate adjustment unit 307. The content scenario detection unit 301 may detect a transmitter bitrate 311 and a network efficiency 313. The rate adjustment unit 307 may include an encoding rate decreasing unit 371, an encoding rate increasing unit 373, an interval rate adjustment unit 375, and an encoding rate selection unit 377. In some embodiments, the rate adjustment unit 307 may include more than one encoding rate increasing unit 373, or more than one encoding rate decreasing unit 371. In some embodiments, different units in the rate adjustment unit 307 may be combined to work together. For example, the encoding rate increasing unit 373 and the interval rate adjustment unit 375 may be combined to increase an encoding rate to an interval of encoding rates. In some other embodiments, the interval rate adjustment unit 375 and the encoding rate selection unit 377 may be combined to select an encoding rate from an interval of encoding rates.

In embodiments, the network congestion parameter unit 303 may be similar to the network congestion parameter unit 173 or the network congestion parameter unit 183 in FIG. 1. The network congestion parameter unit 303 may detect one or more network congestion parameters for a window of one or more frames or during a time period. For example, the one or more network congestion parameters may include a throughput, a goodput, a number of lost packets, a packet delay, or a packet loss rate (PLR) of a multimedia traffic for a window of one or more frames, or during a time period.

In embodiments, the content scenario detection unit 301 may detect a low bitrate scenario based on the transmitter bitrate 311 and the network efficiency 313. The transmitter bitrate 311 may measure a bitrate of a multimedia traffic transmitted by a transmitter, e.g., the transmitter 110. In embodiments, a multimedia traffic may include multiple windows of frames, where a window of frames may include one or more frames generated by an encoder at an encoding rate during a time period. An example of a multimedia traffic including one or more windows of frames may be shown in FIG. 4.

Figure 4:
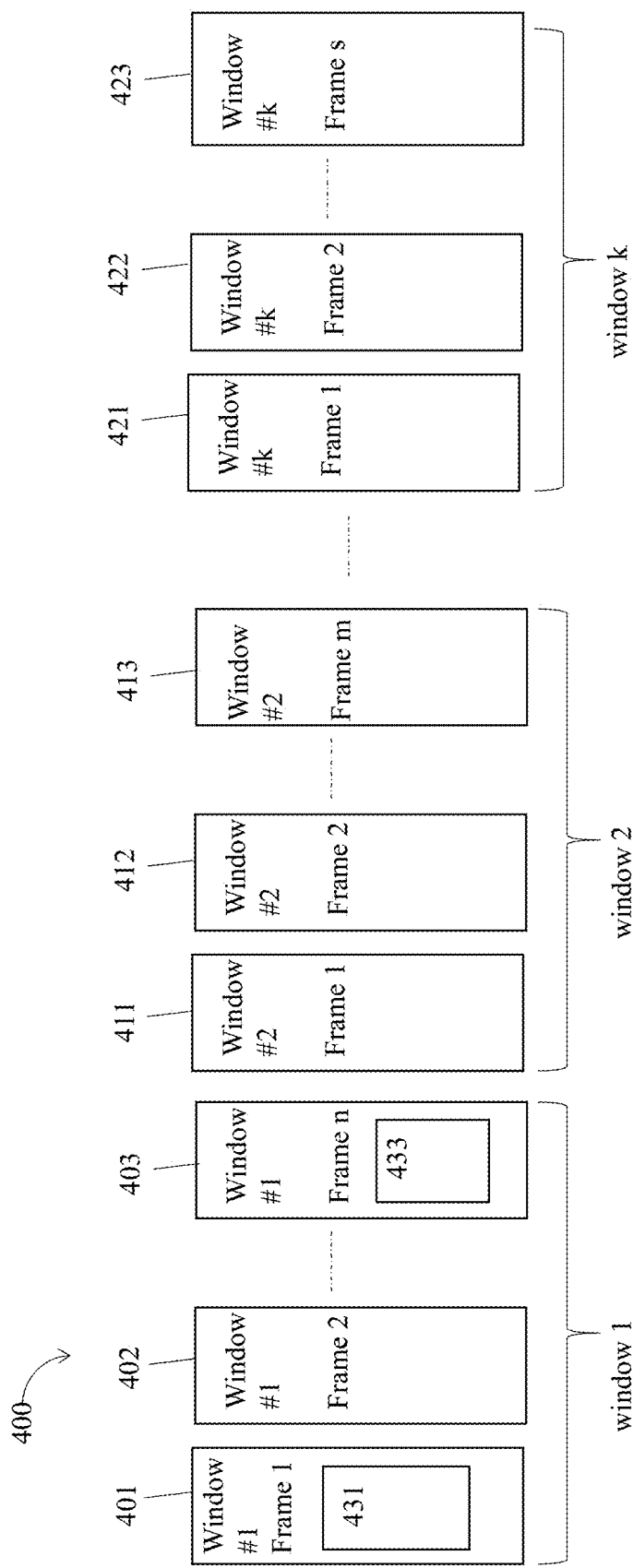
FIG. 4 illustrates an example schematic block diagram of one or more windows of one or more frames of a multimedia traffic, in accordance with various embodiments.

In embodiments, FIG. 4 illustrates an example schematic block diagram of one or more windows, e.g., window 1, window 2, . . . window k, of one or more frames of a multimedia traffic 400, in accordance with various embodiments. The window 1 may include a frame 401, a frame 402, and a frame 403; the window 2 may include a frame 411, a frame 412, and a frame 413; and the window k may include a frame 421, a frame 422, and a frame 423. There may be more frames within each window, and more windows in the multimedia traffic, not shown. Different window of frames may include different number of frames generated during different time durations. For example, the window 1 of frames may have n frames generated during a time period t1; the window 2 of frames may have m frames generated during a time period t2; while the window k of frames may have s frames generated during a time period t3.

In embodiments, the window 1 may include a starting packet 431, and an ending packet 433. The starting packet 431 may include a starting timestamp may be same as frame timestamp of frame 401, to represent a time and/or corresponding frame when the window 1 is started and starting packet 431 may be generated. The ending packet 433 may include an ending timestamp may be same frame timestamp of Frame 403, to represent a time and/or corresponding frame when the window 1 ended and ending packet 433 may be generated. In addition, the packets, e.g., the starting packet 431 or the ending packet 433 may carry other information. For example, the ending packet 433 may include an encoding rate of the transmitter for the frame 401, the frame 402, and the frame 403, within the window 1 of frames.

In embodiments, the content scenario detection unit 301 may detect a low bitrate scenario based on the transmitter bitrate 311 and the network efficiency 313 for a window of frames of a multimedia traffic. For example, for the multimedia traffic 400, the content scenario detection unit 301 may calculate the transmitter bitrate 311 for the window 1, based on a starting timestamp of the starting packet 431, an ending timestamp of the ending packet 433, and an encoding rate of the transmitter for the window 1. The content scenario detection unit 301 may also obtain a receiving bitrate for the receiver, e.g., the receiver 120, which is to measure a bitrate received by the receiver 120 for receiving the frames, e.g., the frame 401, the frame 402, and the frame 403, within the window 1, during a time period the window 1 is received. The content scenario detection unit 301 may further calculate the network efficiency 313 as a ratio between the receiving bitrate and the transmitter bitrate 311.

In embodiments, the starting timestamp of the starting packet 431 and the encoding rate of the transmitter for the window 1 may be included in the ending packet 433. In some other embodiments, the starting timestamp of the starting packet 431 and the encoding rate of the transmitter for the window 1 may be included in a custom header extension of a header of the ending packet 433 of the window 1. In some other embodiments, the starting timestamp of the starting packet 431, the ending timestamp of the ending packet 433, and the encoding rate of the transmitter for the window 1 may be sent by the transmitter 110 as a custom field in a real-time transport protocol (RTP) control protocol (RTCP) sender report.

In embodiments, the transmitter bitrate 311 may be estimated rather than based on the starting timestamp of the starting packet, and the ending timestamp of the ending packet. For example, the transmitter bitrate 311 may be estimated based on a fixed maximum translation unit (MTU) size negotiated by the transmitter 110 and the receiver 120. In some other embodiments, the transmitter bitrate 311 may be estimated based on a number of missing packets and an average packet size. For example, the transmitter bitrate 311 may be equal to the sum of the receiving bitrate of the receiver and (the number of missing packets)*(average packet size). Estimated transmitter bitrate may be useful when the transmitter 110 and the receiver 120 may not be compatible and may not be able to gain the information used for the calculation of the transmitter bitrate.

In embodiments, the parameter selection unit 305 may determine parameters to be used by the rate adjustment unit 307 to determine an encoding rate. The parameter selection unit 305 may monitor the one or more network congestion parameters determined by the network congestion parameter unit 303, the transmitter bitrate 311 and the network efficiency 313 determined by the content scenario detection unit 301. The parameter selection unit 305 may select to use a subset of the one or more network congestion parameters alone by the rate adjustment unit 307 to determine an encoding rate. Additionally and alternatively, when a low bitrate scenario of a multimedia content is detected, the parameter selection unit 305 may select to use the transmitter bitrate 311 and the network efficiency 313 by the rate adjustment unit 307 to determine an encoding rate. In addition, the parameter selection unit 305 may select a combination of the transmitter bitrate 311, the network efficiency 313, and other network congestion parameters by the rate adjustment unit 307 to determine an encoding rate.

For example, a received bitrate may be compared against a corresponding transmitter bitrate to determine if they are within same range with some tolerance (±δ). When a received bitrate may be within same range as a corresponding transmitter bitrate 311 with some tolerance (±δ), the network efficiency 313 may be high. When a receiving bit rate may be low, and the network efficiency 313 may be high, the parameter selection unit 305 may select to use the transmitter bitrate 311 and the network efficiency 313 to be the parameters for the rate adjustment unit 307 to determine an encoding rate. In embodiments, the rate adjustment unit 307 may determine to increase the encoding rate for the transmitter when receiving bit rate may be low, and the network efficiency 313 may be high.

In embodiments, the rate adjustment unit 307 may include the encoding rate decreasing unit 371, the encoding rate increasing unit 373, the interval rate adjustment unit 375, and the encoding rate selection unit 377. The encoding rate decreasing unit 371 may decrease a first encoding rate to obtain a second encoding rate based at least in part on a set of parameters related to the transmitter bitrate 311, the network efficiency 313, the goodput, the packet delay, or the PLR of the multimedia traffic. The encoding rate increasing unit 373 may increase a first encoding rate to obtain a second encoding rate based at least in part on a set of parameters related to the transmitter bitrate 311, the network efficiency 313, the goodput, the packet delay, or the PLR of the multimedia traffic. The interval rate adjustment unit 375 may adjust an encoding rate to an interval of encoding rates based at least in part on a set of parameters related to the transmitter bitrate 311, the network efficiency 313, the goodput, the package delay, or the PLR of the multimedia traffic. The encoding rate selection unit 377 may select a second encoding rate from an interval of encoding rates based at least in part on a set of parameters related to the transmitter bitrate 311, the network efficiency 313, the goodput, the package delay, or the PLR of the multimedia traffic.

In embodiments, the rate adjustment unit 307 may include more than one encoding rate increasing unit 373, or more than one encoding rate decreasing unit 371. In some embodiments, different units in the rate adjustment unit 307 may be combined to work together. For example, the encoding rate increasing unit 373 and the interval rate adjustment unit 375 may be combined to increase an encoding rate to an interval of encoding rates. In some other embodiments, the interval rate adjustment unit 375 and the encoding rate selection unit 377 may be combined to select an encoding rate from an interval of encoding rates. For example, the rate adjustment unit 307 may include a first rate adjustment unit and a second rate adjustment unit, wherein the first rate adjustment unit is to periodically, according to a first period, increase the first encoding rate by a multiple of a first rate adjustment value to obtain the second encoding rate, and the second rate adjustment unit is to periodically, according to a second period, increase the first encoding rate by a multiple of a second rate adjustment value to obtain the second encoding rate.

Figure 5:
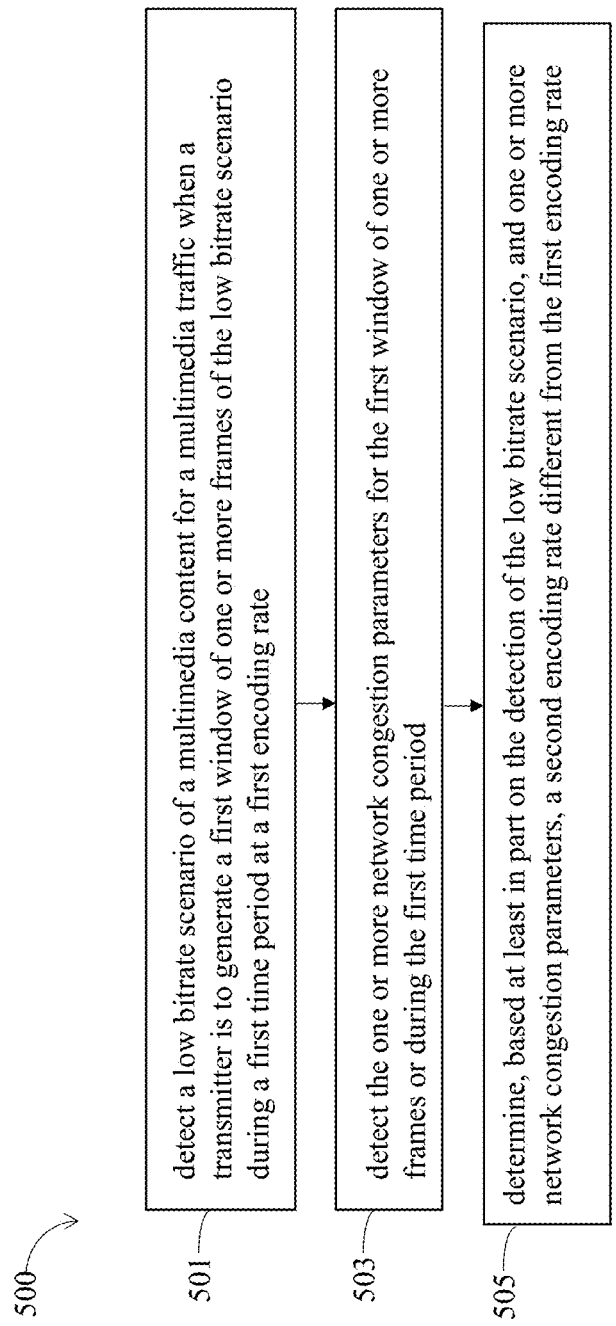
FIG. 5 illustrates an example process for a rate adjustment unit to determine an encoding rate for a multimedia traffic based on content scenario, in accordance with various embodiments.

FIG. 5 illustrates an example process 500 for a rate adjustment unit to determine an encoding rate for a multimedia traffic based on content scenario, in accordance with various embodiments. In embodiments, the process 500 may be performed by the rate adjustment unit 175, the rate adjustment unit 185, the rate adjustment unit 221, the rate adjustment unit 241, or the rate adjustment unit 307 as shown in FIG. 1, FIG. 2, and FIG. 3.

The process 500 may start at an interaction 501. During the interaction 501, when a transmitter is to generate a first window of one or more frames of a multimedia content during a first time period at a first encoding rate, a low bitrate scenario of the multimedia content for a multimedia traffic may be detected. For example, at the interaction 501, the content scenario detection unit 181 may detect a low bitrate scenario, e.g., the low bitrate scenario 161, of the multimedia content 106 received by the receiver 120, from the first window of one or more frames generated at the first encoding rate by the transmitter 110 during a first time period.

During an interaction 503, one or more network congestion parameters may be detected for the first window of one or more frames or during the first time period. For example, at the interaction 503, the network congestion parameter unit 183 may detect one or more network congestion parameters for the first window of one or more frames generated at the first encoding rate by the transmitter 110 during the first time period.

During an interaction 505, a second encoding rate may be determined, based at least in part on the detection of the low bitrate scenario, and one or more network congestion parameters, where the second encoding rate may be different from the first encoding rate. For example, at the interaction 505, the rate adjustment unit 185 may determine, based at least in part on the detection of the low bitrate scenario 161, and one or more network congestion parameters, a second encoding rate different from the first encoding rate.

Figure 6:
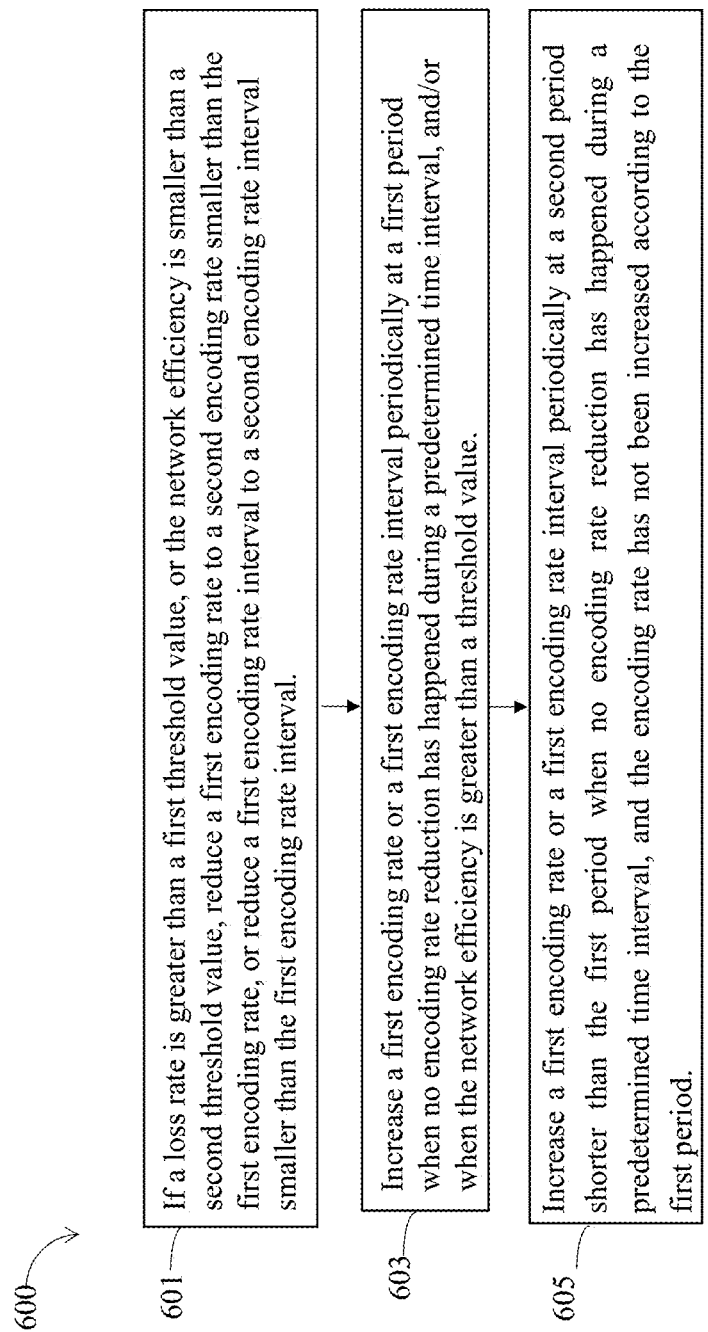
FIG. 6 illustrates another example process for a rate adjustment unit to determine an encoding rate for a multimedia traffic based on content scenario, in accordance with various embodiments.

FIG. 6 illustrates another example process 600 for a rate adjustment unit to determine an encoding rate for a multimedia traffic based on content scenario, in accordance with various embodiments. In embodiments, the process 600 may be performed by the rate adjustment unit 175, the rate adjustment unit 185, the rate adjustment unit 221, the rate adjustment unit 241, or the rate adjustment unit 307 as shown in FIG. 1, FIG. 2, and FIG. 3.

The process 600 may start at an interaction 601. During the interaction 601, if a loss rate is greater than a first threshold value, or the network efficiency is smaller than a second threshold value, a first encoding rate may be reduced to a second encoding rate smaller than the first encoding rate, or a first encoding rate interval may be reduced to a second encoding rate interval smaller than the first encoding rate interval.

In embodiments, multiple network efficiencies of multiple windows of frames may be used to determine to increase or decrease a first encoding rate. For example, an average network efficiency may be defined as equal to MEAN (NW_Eff$_n$, NW_Eff$_{n-1}$, NW_Eff$_{n-2}$), where NW_Effn, NW_Effn-1, NW_Effn-2 are network efficiencies for three adjacent windows of frames, as shown in FIG. 4. Further operations may be performed on the average network efficiency to obtain a final network efficiency, Final_NW_Eff=MIN(NW_Eff$_n$, NW_Eff$_{avg}$). Final_NW_Eff may be used to adjust an encoding rate interval, e.g., new encoding rate interval may be equal to the product of Final_NW_Eff and the existing encoding rate interval, shown as follows: New rate(min, max)=NW_Eff*rate(min, max).

During the interaction 603, a first encoding rate or a first encoding rate interval may be periodically increased at a first period when no encoding rate reduction has happened during a predetermined time interval, and/or when the network efficiency is greater than a threshold value.

In embodiments, a first encoding rate or a first encoding rate interval may be periodically increased every second, when no encoding rate reduction has happened during last 500 ms, and the network efficiency is greater than 85%. The encoding rate increase may be by a multiple of a basic unit, e.g., BW_INC_STEP. For example, when the network efficiency NW_Eff is greater than 98%, new rate_interval (min, max)=old rate_interval (min, max)+BW_INC_STEP*2; otherwise, when the network efficiency NW_Eff is less than 98%, but greater than 90%, new rate_interval (min, max) =old rate_interval (min, max)+BW_INC_STEP; otherwise, when the network efficiency NW_Eff is less than 90%, but greater than 85%, new rate_interval (min, max)=old rate_interval (min, max)+BW_INC_STEP/2.

During the interaction 605, a first encoding rate or a first encoding rate interval may be periodically increased at a second period shorter than the first period when no encoding rate reduction has happened during a predetermined time interval, and the encoding rate has not been increased according to the first period.

In embodiments, a first encoding rate or a first encoding rate interval may be periodically increased every 300 ms, when no encoding rate reduction has happened during last 500 ms, and the encoding rate has not been increased according every second. In such situation, when the network efficiency NW_Eff is greater than 95%, new rate_interval (min, max)=old rate_interval (min, max)+BW_INC_STEP/ 2; otherwise, when the network efficiency NW_Eff is less than 95%, but greater than 85%, new rate_interval (min, max)=old rate_interval (min, max)+BW_INC_STEP/4.

Figure 7:
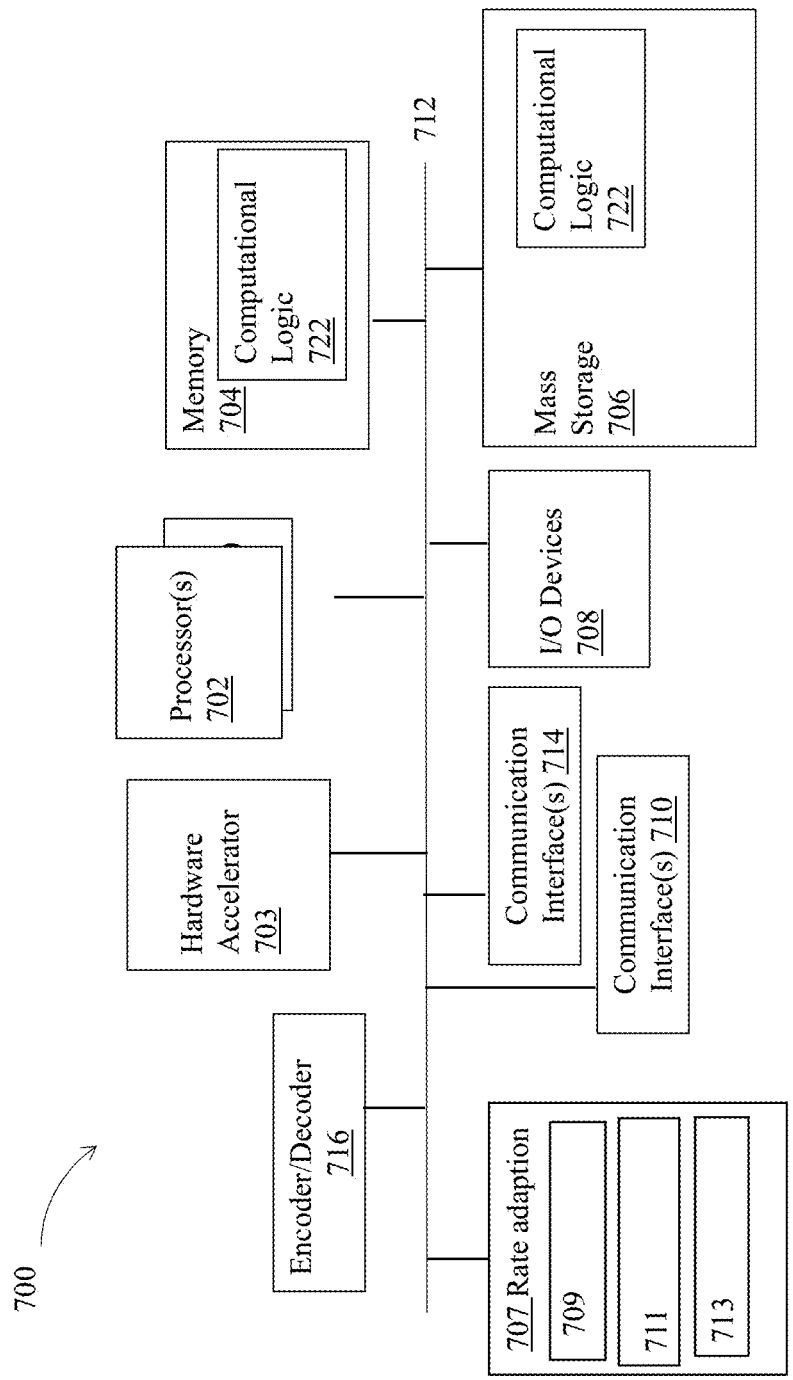
FIG. 7 illustrates an example device suitable for use to practice various aspects of the present disclosure, in accordance with various embodiments.

FIG. 7 illustrates an example communication device 700 that may be suitable as a device to practice selected aspects of the present disclosure. The device 700 may be an example of the transmitter 110, the receiver 120, the device 202, the device 204, the apparatus 300, or a communication device to implement the process 500 or the process 600, as shown in FIG. 1, FIG. 2, FIG. 3, FIG. 5, or FIG. 6. As shown, the device 700 may include one or more processors 702, each having one or more processor cores, and optionally, a hardware accelerator 703 (which may be an ASIC or a FPGA). In alternate embodiments, the hardware accelerator 703 may be part of processor 702, or integrated together on a SOC. Additionally, the device 700 may include a memory 704, which may be any one of a number of known persistent storage medium, and mass storage 706. Furthermore, the device 700 may include communication interfaces 710 and 714. Communication interfaces 710 and 714 may be any one of a number of known communication interfaces. In addition, the 700 may include input/output devices 708. Furthermore, the device 700 may include an encoder/decoder 716, a rate adaptation unit 707 that includes a content scenario detection unit 709, a network congestion parameter unit 711, and a rate adjustment unit 713, which may be an example of the encoder 101, the decoder 102, the rate adaptation unit 107 that includes the content scenario detection unit 171, the network congestion parameter unit 173, and the rate adjustment unit 175, or the rate adaptation unit 108 that includes the content scenario detection unit 181, the network congestion parameter unit 183, and the rate adjustment unit 185, as shown in FIG. 1. The elements may be coupled to each other via system bus 712, which may represent one or more buses. In the case of multiple buses, they may be bridged by one or more bus bridges (not shown).

Each of these elements may perform its conventional functions known in the art. In particular, system memory 704 may be employed to store a working copy and a permanent copy of the programming instructions implementing an operating system, one or more applications, and/or the operations associated with determining an encoding rate for a multimedia traffic based on content scenario, as described in connection with FIGS. 1-6, such as software implementations of the entirety or portions of encoder/ decoder 716, rate adaptation unit 707 (including content scenario detection unit 709, network congestion parameter unit 711, and/or rate adjustment unit 713), and/or other functions, collectively referred to as computational logic 722. The various elements may be implemented by assembler instructions supported by processor(s) 702 or high-level languages, such as, for example, C, that can be compiled into such instructions.

The various elements may be implemented by assembler instructions supported by processor(s) 702 or high-level languages, such as, for example, C, that can be compiled into such instructions. Operations associated with safety operations and configuration of safety operations not implemented in software may be implemented in hardware, e.g., via hardware accelerator 703.

The number, capability and/or capacity of these elements 701-722 may vary, depending on the number of other devices the device 700 is configured to support. Otherwise, the constitutions of elements 701-722 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 8:
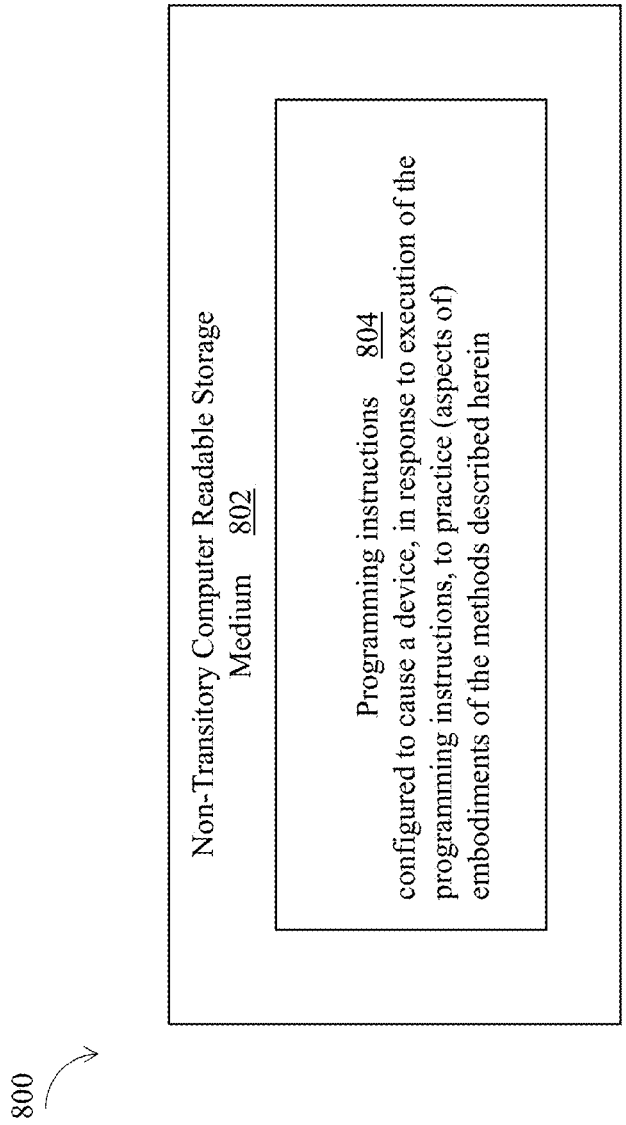
FIG. 8 illustrates a storage medium having instructions for practicing methods described with references to FIGS. 1-7, in accordance with various embodiments.

Furthermore, the present disclosure may take the form of a computer program product embodied in any tangible or non-transitory medium of expression having computer-usable program code embodied in the medium. FIG. 8 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 802 may include a number of programming instructions 804. Programming instructions 804 may be configured to enable a device, e.g., device 700 employed as a transmitter 110 or the receiver 120, in response to execution of the programming instructions, to perform, e.g., various corresponding operations in a transmitter or a receiver, associated with determining an encoding rate for a multimedia traffic based on content scenario, as shown in FIGS. 1-7, such as those operations associated with an encoder/decoder, a rate adaptation unit that includes a content scenario detection unit, a network congestion parameter unit, and/or a rate adjustment unit.

In alternate embodiments, programming instructions 804 may be disposed on multiple computer-readable non-transitory storage media 802 instead. In alternate embodiments, programming instructions 804 may be disposed on computer-readable transitory storage media 802, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 may include an apparatus for multimedia communication, comprising: a content scenario detection unit to detect a first bitrate scenario of a multimedia content for a multimedia traffic when a transmitter is to generate a first window of one or more frames of the first bitrate scenario during a first time period at a first encoding rate, wherein the multimedia content includes the first bitrate scenario represented by a first bitrate, and a second bitrate scenario represented by a second bitrate larger than the first bitrate; and a rate adjustment unit coupled to the content scenario detection unit, to determine, based at least in part on the detection of the first bitrate scenario, and one or more network congestion parameters, a second encoding rate different from the first encoding rate; wherein the transmitter generates at the second encoding rate a second window of one or more frames of the first bitrate scenario during a second time period to follow the first time period.

Example 2 may include the apparatus of example 1 and/or some other examples herein, wherein the first bitrate scenario is a section of the multimedia content that includes one or more scenes with frames of first quality, a first framerate, or a first number of movement in the one or more scenes, and the second bitrate scenario is a section of the multimedia content that includes one or more scenes with frames of a quality higher than the first quality, a framerate higher than the first framerate, or a number of movement higher than the first number of movement.

Example 3 may include the apparatus of example 1 and/or some other examples herein, wherein a difference between the first encoding rate and the second encoding rate is a multiple of a predetermined rate adjustment step value.

Example 4 may include the apparatus of example 1 and/or some other examples herein, wherein the one or more network congestion parameters include a goodput, a packet delay, or a packet loss rate (PLR) of the multimedia traffic for the first window of one or more frames, or during the first time period.

Example 5 may include the apparatus of example 1 and/or some other examples herein, wherein the content scenario detection unit is to detect the first bitrate scenario based on a transmitter bitrate of the transmitter to measure a bitrate of the multimedia traffic transmitted by the transmitter for the first window of one or more frames, or during the first time period, and a network efficiency defined as a ratio between a receiving bitrate and the transmitter bitrate, wherein the receiving bitrate is to measure a bitrate received by a receiver during the first window of one or more frames or during the first time period.

Example 6 may include the apparatus of any one of examples 1-5 and/or some other examples herein, wherein the transmitter bitrate is calculated based on a starting timestamp of a starting packet of the first window of one or more frames, an ending timestamp of an ending packet of the first window of one or more frames, and the first encoding rate of the transmitter for the first window of one or more frames.

Example 7 may include the apparatus of example 6 and/or some other examples herein, wherein the starting timestamp of the starting packet of the first window of one or more frames and the first encoding rate of the transmitter for the first window of one or more frames are included in a custom header extension of a header of the ending packet of the first window.

Example 8 may include the apparatus of example 6 and/or some other examples herein, wherein the starting timestamp of the starting packet, the ending timestamp of the ending packet, and the first encoding rate of the transmitter for the first window of one or more frames are sent by the transmitter as a custom field in a real-time transport protocol (RTP) control protocol (RTCP) sender report.

Example 9 may include the apparatus of any one of examples 1-5 and/or some other examples herein, wherein the transmitter bitrate is estimated based on a maximum transmission unit (MTU) size, or a number of missing packets and an average packet size.

Example 10 may include the apparatus of any one of examples 1-5 and/or some other examples herein, wherein the rate adjustment unit is to determine to decrease the first encoding rate to obtain the second encoding rate based at least in part on a set of parameters related to the transmitter bitrate, the network efficiency, the goodput, the packet delay, or the PLR of the multimedia traffic.

Example 11 may include the apparatus of any one of examples 1-5 and/or some other examples herein, wherein the rate adjustment unit is to determine to increase the first encoding rate to obtain the second encoding rate based at least in part on a set of parameters related to the transmitter bitrate, the network efficiency, the goodput, the packet delay, or the PLR of the multimedia traffic.

Example 12 may include the apparatus of any one of examples 1-5 and/or some other examples herein, wherein the rate adjustment unit includes an interval rate adjustment unit to adjust the first encoding rate to an interval of encoding rates based at least in part on a set of parameters related to the transmitter bitrate, the network efficiency, the goodput, the package delay, or the PLR of the multimedia traffic.

Example 13 may include the apparatus of example 12 and/or some other examples herein, wherein the rate adjustment unit includes an encoding rate selection unit coupled to the interval rate adjustment unit to select the second encoding rate from the interval of encoding rates based at least in part on a set of parameters related to the transmitter bitrate, the network efficiency, the goodput, the package delay, or the PLR of the multimedia traffic.

Example 14 may include the apparatus of any one of examples 1-5 and/or some other examples herein, wherein the rate adjustment unit includes a first rate adjustment unit and a second rate adjustment unit, wherein the first rate adjustment unit is to periodically, according to a first period, increase the first encoding rate by a multiple of a first rate adjustment value to obtain the second encoding rate, and the second rate adjustment unit is to periodically, according to a second period, increase the first encoding rate by a multiple of a second rate adjustment value to obtain the second encoding rate.

Example 15 may include the apparatus of any one of examples 1-5 and/or some other examples herein, further comprising: a network congestion parameter unit coupled to the rate adjustment unit to detect the one or more network congestion parameters for the first window of one or more frames or during the first time period.

Example 16 may include the apparatus of any one of examples 1-5 and/or some other examples herein, further comprising: a feedback unit coupled to the rate adjustment unit to provide the second encoding rate to the transmitter.

Example 17 may include the apparatus of any one of examples 1-5 and/or some other examples herein, wherein the apparatus is a wireless communication device, a wired communication device, a personal computer (PC), a desktop computer, a mobile computer, a laptop computer, a notebook computer, an Ultrabook™ computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a video device, an audio device, or an audio-video (A/V) device.

Example 18 may include an apparatus for multimedia communication, comprising: a content scenario detection unit to detect a first bitrate scenario of a multimedia content for a multimedia traffic when a transmitter is to generate a first window of one or more frames of the first bitrate scenario during a first time period at a first encoding rate, wherein the multimedia content includes the first bitrate scenario represented by a first bitrate, and a second bitrate scenario represented by a second bitrate larger than the first bitrate; a rate adjustment unit coupled to the content scenario detection unit, to determine, based at least in part on the detection of the first bitrate scenario, and one or more network congestion parameters, a second encoding rate different from the first encoding rate; and an encoding unit coupled to the rate adjustment unit to generate at the second encoding rate a second window of one or more frames of the first bitrate scenario during a second time period to follow the first time period.

Example 19 may include the apparatus of example 18 and/or some other examples herein, wherein the content scenario detection unit is to detect the first bitrate scenario based on a transmitter bitrate of the transmitter to measure a bitrate of the multimedia traffic transmitted by the transmitter for the first window of one or more frames, or during the first time period, and a network efficiency defined as a ratio between a receiving bitrate and the transmitter bitrate, wherein the receiving bitrate is to measure a bitrate received by a receiver during the first window of one or more frames or during the first time period.

Example 20 may include the apparatus of any one of examples 18-19 and/or some other examples herein, wherein the one or more network congestion parameters include a goodput, a packet delay, or a packet loss rate (PLR) of the multimedia traffic for the first window of one or more frames, or during the first time period.

Example 21 may include the apparatus of any one of examples 18-19 and/or some other examples herein, wherein a difference between the first encoding rate and the second encoding rate is a multiple of a predetermined rate adjustment step value.

Example 22 may include an apparatus for multimedia communication, comprising: a content scenario detection unit to detect a first bitrate scenario of a multimedia content for a multimedia traffic when a transmitter is to generate a first window of one or more frames of the first bitrate scenario during a first time period at a first encoding rate, wherein the multimedia content includes the first bitrate scenario represented by a first bitrate, and a second bitrate scenario represented by a second bitrate larger than the first bitrate; a network congestion parameter unit to detect one or more network congestion parameters for the first window of one or more frames or during the first time period; a rate adjustment unit coupled to the content scenario detection unit and the network congestion parameter unit, to determine, based at least in part on the detection of the first bitrate scenario and the one or more network congestion parameters, a second encoding rate different from the first encoding rate; and a feedback unit coupled to the rate adjustment unit to provide the second encoding rate to the transmitter, wherein the transmitter is to generate at the second encoding rate a second window of one or more frames of the first bitrate scenario during a second time period to follow the first time period.

Example 23 may include the apparatus of example 22 and/or some other examples herein, wherein the first bitrate scenario is a section of the multimedia content that includes one or more scenes with frames of first quality, a first framerate, or a first number of movement in the one or more scenes, and the second bitrate scenario is a section of the multimedia content that includes one or more scenes with frames of a quality higher than the first quality, a framerate higher than the first framerate, or a number of movement higher than the first number of movement.

Example 24 may include the apparatus of any one of examples 22-23 and/or some other examples herein, wherein the one or more network congestion parameters include a goodput, a packet delay, or a packet loss rate (PLR) of the multimedia traffic for the first window of one or more frames, or during the first time period.

Example 25 may include the apparatus of any one of examples 22-23 and/or some other examples herein, wherein the content scenario detection unit is to detect the first bitrate scenario based on a transmitter bitrate of the transmitter to measure a bitrate of the multimedia traffic transmitted by the transmitter for the first window of one or more frames, or during the first time period, and a network efficiency defined as a ratio between a receiving bitrate and the transmitter bitrate, wherein the receiving bitrate is to measure a bitrate received by a receiver during the first window of one or more frames or during the first time period.

Example 26 may include a method for multimedia communication, comprising: detecting a first bitrate scenario of a multimedia content for a multimedia traffic when a transmitter is to generate a window of one or more frames of the first bitrate scenario during a first time period at a first encoding rate, wherein the multimedia content includes the first bitrate scenario represented by a first bitrate, and a second bitrate scenario represented by a second bitrate larger than the first bitrate; detecting one or more network congestion parameters for the window of one or more frames or during the first time period; and determining, based at least in part on the detection of the first bitrate scenario, and the one or more network congestion parameters, a second encoding rate different from the first encoding rate, wherein the transmitter is to generate at the second encoding rate another window of one or more frames of the first bitrate scenario during a second time period to follow the first time period.

Example 27 may include the method of example 26 and/or some other examples herein, further comprising: providing the second encoding rate to the transmitter.

Example 28 may include the method of any one of examples 26-27 and/or some other examples herein, wherein the first bitrate scenario is a section of the multimedia content that includes one or more scenes with frames of first quality, a first framerate, or a first number of movement in the one or more scenes, and the second bitrate scenario is a section of the multimedia content that includes one or more scenes with frames of a quality higher than the first quality, a framerate higher than the first framerate, or a number of movement higher than the first number of movement.

Example 29 may include the method of any one of examples 26-27 and/or some other examples herein, wherein a difference between the first encoding rate and the second encoding rate is a multiple of a predetermined rate adjustment step value.

Example 30 may include the method of any one of examples 26-27 and/or some other examples herein, wherein the one or more network congestion parameters include a goodput, a packet delay, or a packet loss rate (PLR) of the multimedia traffic for the window of one or more frames, or during the first time period.

Example 31 may include the method of any one of examples 26-27 and/or some other examples herein, wherein the detecting the first bitrate scenario of the multimedia content includes detecting the first bitrate scenario based on a transmitter bitrate of the transmitter to measure a bitrate of the multimedia traffic transmitted by the transmitter for the window of one or more frames, or during the first time period, and a network efficiency defined as a ratio between a receiving bitrate and the transmitter bitrate, wherein the receiving bitrate is to measure a bitrate received by a receiver during the window of one or more frames or during the first time period.

Example 32 may include the method of example 31 and/or some other examples herein, wherein the transmitter bitrate is calculated based on a starting timestamp of a starting packet of the window of one or more frames, an ending timestamp of an ending packet of the window of one or more frames, and the first encoding rate of the transmitter for the window of one or more frames.

Example 33 may include one or more computer-readable media having instructions for multimedia communication, upon execution of the instructions by one or more processors, to perform the method of any one of examples 26-32.

Example 34 may include an apparatus for multimedia communication, comprising: means for detecting a first bitrate scenario of a multimedia content for a multimedia traffic when a transmitter is to generate a window of one or more frames of the first bitrate scenario during a first time period at a first encoding rate, wherein the multimedia content includes the first bitrate scenario represented by a first bitrate, and a second bitrate scenario represented by a second bitrate larger than the first bitrate; means for detecting one or more network congestion parameters for the window of one or more frames or during the first time period; and means for determining, based at least in part on the detection of the first bitrate scenario, and the one or more network congestion parameters, a second encoding rate different from the first encoding rate, wherein the transmitter is to generate at the second encoding rate another window of one or more frames of the first bitrate scenario during a second time period to follow the first time period.

Example 35 may include the apparatus of example 34 and/or some other examples herein, further comprising: means for providing the second encoding rate to the transmitter.

Example 36 may include the apparatus of any one of examples 34-35 and/or some other examples herein, wherein the first bitrate scenario is a section of the multimedia content that includes one or more scenes with frames of first quality, a first framerate, or a first number of movement in the one or more scenes, and the second bitrate scenario is a section of the multimedia content that includes one or more scenes with frames of a quality higher than the first quality, a framerate higher than the first framerate, or a number of movement higher than the first number of movement.

Example 37 may include the apparatus of any one of examples 34-35 and/or some other examples herein, wherein a difference between the first encoding rate and the second encoding rate is a multiple of a predetermined rate adjustment step value.

Example 38 may include the apparatus of any one of examples 34-35 and/or some other examples herein, wherein the one or more network congestion parameters include a goodput, a packet delay, or a packet loss rate (PLR) of the multimedia traffic for the window of one or more frames, or during the first time period.

Example 39 may include the apparatus of any one of examples 34-35 and/or some other examples herein, wherein the means for detecting the first bitrate scenario of the multimedia content includes means for detecting the first bitrate scenario based on a transmitter bitrate of the transmitter to measure a bitrate of the multimedia traffic transmitted by the transmitter for the window of one or more frames, or during the first time period, and a network efficiency defined as a ratio between a receiving bitrate and the transmitter bitrate, wherein the receiving bitrate is to measure a bitrate received by a receiver during the window of one or more frames or during the first time period.

Example 40 may include the apparatus of example 39 and/or some other examples herein, wherein the transmitter bitrate is calculated based on a starting timestamp of a starting packet of the window of one or more frames, an ending timestamp of an ending packet of the window of one or more frames, and the first encoding rate of the transmitter for the window of one or more frames.

Although certain embodiments have been illustrated and described herein for purposes of description this application is intended to cover any adaptations or variations of the embodiments discussed herein. Therefore, it is manifestly intended that embodiments described herein be limited only by the claims.

What is claimed is:

1. An apparatus for multimedia communication, comprising:
 a content scenario detection unit to detect a first bitrate scenario of a multimedia content for a multimedia traffic when a transmitter is to generate a first window of one or more frames of the first bitrate scenario during a first time period at a first encoding rate, the first bitrate scenario having a first plurality of windows, each window having one or more frames, wherein the multimedia content includes the first bitrate scenario represented by a first bitrate, and a second bitrate scenario to follow the first bitrate scenario, the second bitrate scenario having a second plurality of windows, each window having one or more frames of the multimedia content represented by a second bitrate larger than the first bitrate; and
 a rate adjustment unit coupled to the content scenario detection unit, to determine, based at least in part on the detection of the first bitrate scenario, and one or more network congestion parameters, a second encoding rate different from the first encoding rate;

wherein the transmitter generates at the second encoding rate a second window of one or more frames of the first bitrate scenario during a second time period to follow the first time period.

2. The apparatus of claim 1, wherein the first bitrate scenario is a section of the multimedia content that includes one or more scenes with frames of first quality, a first framerate, or a first number of movement in the one or more scenes, and the second bitrate scenario is a section of the multimedia content that includes one or more scenes with frames of a quality higher than the first quality, a framerate higher than the first framerate, or a number of movement higher than the first number of movement.

3. The apparatus of claim 1, wherein a difference between the first encoding rate and the second encoding rate is a multiple of a predetermined rate adjustment step value.

4. The apparatus of claim 1, wherein the one or more network congestion parameters include a goodput, a packet delay, or a packet loss rate (PLR) of the multimedia traffic for the first window of one or more frames, or during the first time period.

5. The apparatus of claim 1, wherein the content scenario detection unit is to detect the first bitrate scenario based on a transmitter bitrate of the transmitter to measure a bitrate of the multimedia traffic transmitted by the transmitter for the first window of one or more frames, or during the first time period, and a network efficiency defined as a ratio between a receiving bitrate and the transmitter bitrate, wherein the receiving bitrate is to measure a bitrate received by a receiver during the first window of one or more frames or during the first time period.

6. The apparatus of claim 5, wherein the transmitter bitrate is calculated based on a starting timestamp of a starting packet of the first window of one or more frames, an ending timestamp of an ending packet of the first window of one or more frames, and the first encoding rate of the transmitter for the first window of one or more frames.

7. The apparatus of claim 6, wherein the starting timestamp of the starting packet of the first window of one or more frames and the first encoding rate of the transmitter for the first window of one or more frames are included in a custom header extension of a header of the ending packet of the first window.

8. The apparatus of claim 6, wherein the starting timestamp of the starting packet, the ending timestamp of the ending packet, and the first encoding rate of the transmitter for the first window of one or more frames are sent by the transmitter as a custom field in a real-time transport protocol (RTP) control protocol (RTCP) sender report.

9. The apparatus of claim 5, wherein the transmitter bitrate is estimated based on a maximum transmission unit (MTU) size, or a number of missing packets and an average packet size.

10. The apparatus of claim 5, wherein the rate adjustment unit is to determine to decrease the first encoding rate to obtain the second encoding rate based at least in part on a set of parameters related to the transmitter bitrate, the network efficiency, a goodput, a packet delay, or a PLR of the multimedia traffic.

11. The apparatus of claim 5, wherein the rate adjustment unit is to determine to increase the first encoding rate to obtain the second encoding rate based at least in part on a set of parameters related to the transmitter bitrate, the network efficiency, a goodput, a packet delay, or a PLR of the multimedia traffic.

12. The apparatus of claim 5, wherein the rate adjustment unit includes an interval rate adjustment unit to adjust the first encoding rate to an interval of encoding rates based at least in part on a set of parameters related to the transmitter bitrate, the network efficiency, a goodput, a package delay, or a PLR of the multimedia traffic.

13. The apparatus of claim 12, wherein the rate adjustment unit includes an encoding rate selection unit coupled to the interval rate adjustment unit to select the second encoding rate from the interval of encoding rates based at least in part on a set of parameters related to the transmitter bitrate, the network efficiency, a goodput, a package delay, or a PLR of the multimedia traffic.

14. The apparatus of claim 5, wherein the rate adjustment unit includes a first rate adjustment unit and a second rate adjustment unit, wherein the first rate adjustment unit is to periodically, according to a first period, increase the first encoding rate by a multiple of a first rate adjustment value to obtain the second encoding rate, and the second rate adjustment unit is to periodically, according to a second period, increase the first encoding rate by a multiple of a second rate adjustment value to obtain the second encoding rate.

15. The apparatus of claim 1, further comprising:
a network congestion parameter unit coupled to the rate adjustment unit to detect the one or more network congestion parameters for the first window of one or more frames or during the first time period.

16. The apparatus of claim 1, further comprising:
a feedback unit coupled to the rate adjustment unit to provide the second encoding rate to the transmitter.

17. The apparatus of claim 1, wherein the apparatus is a wireless communication device, a wired communication device, a personal computer (PC), a desktop computer, a mobile computer, a laptop computer, a notebook computer, an Ultrabook™ computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a video device, an audio device, or an audio-video (AN) device.

18. An apparatus for multimedia communication, comprising:
a content scenario detection unit to detect a first bitrate scenario of a multimedia content for a multimedia traffic when a transmitter is to generate a first window of one or more frames of the first bitrate scenario during a first time period at a first encoding rate, the first bitrate scenario having a first plurality of windows, each window having one or more frames, wherein the multimedia content includes the first bitrate scenario represented by a first bitrate, and a second bitrate scenario to follow the first bitrate scenario, the second bitrate scenario having a second plurality of windows, each window having one or more frames of the multimedia content represented by a second bitrate larger than the first bitrate;
a rate adjustment unit coupled to the content scenario detection unit, to determine, based at least in part on the detection of the first bitrate scenario, and one or more network congestion parameters, a second encoding rate different from the first encoding rate; and
an encoding unit coupled to the rate adjustment unit to generate at the second encoding rate a second window of one or more frames of the first bitrate scenario during a second time period to follow the first time period.

19. The apparatus of claim 18, wherein the content scenario detection unit is to detect the first bitrate scenario based on a transmitter bitrate of the transmitter to measure a bitrate of the multimedia traffic transmitted by the transmitter for the first window of one or more frames, or during the first time period, and a network efficiency defined as a ratio between a receiving bitrate and the transmitter bitrate, wherein the receiving bitrate is to measure a bitrate received by a receiver during the first window of one or more frames or during the first time period.

20. The apparatus of claim 18, wherein the one or more network congestion parameters include a goodput, a packet delay, or a packet loss rate (PLR) of the multimedia traffic for the first window of one or more frames, or during the first time period.

21. The apparatus of claim 18, wherein a difference between the first encoding rate and the second encoding rate is a multiple of a predetermined rate adjustment step value.

22. An apparatus for multimedia communication, comprising:
   a content scenario detection unit to detect a first bitrate scenario of a multimedia content for a multimedia traffic when a transmitter is to generate a first window of one or more frames of the first bitrate scenario during a first time period at a first encoding rate, the first bitrate scenario having a first plurality of windows, each window having one or more frames, wherein the multimedia content includes the first bitrate scenario represented by a first bitrate, and a second bitrate scenario to follow the first bitrate scenario, the second bitrate scenario having a second plurality of windows, each window having one or more frames of the multimedia content represented by a second bitrate larger than the first bitrate;
   a network congestion parameter unit to detect one or more network congestion parameters for the first window of one or more frames or during the first time period;
   a rate adjustment unit coupled to the content scenario detection unit and the network congestion parameter unit, to determine, based at least in part on the detection of the first bitrate scenario and the one or more network congestion parameters, a second encoding rate different from the first encoding rate; and
   a feedback unit coupled to the rate adjustment unit to provide the second encoding rate to the transmitter, wherein the transmitter is to generate at the second encoding rate a second window of one or more frames of the first bitrate scenario during a second time period to follow the first time period.

23. The apparatus of claim 22, wherein the first bitrate scenario is a section of the multimedia content that includes one or more scenes with frames of first quality, a first framerate, or a first number of movement in the one or more scenes, and the second bitrate scenario is a section of the multimedia content that includes one or more scenes with frames of a quality higher than the first quality, a framerate higher than the first framerate, or a number of movement higher than the first number of movement.

24. The apparatus of claim 22, wherein the one or more network congestion parameters include a goodput, a packet delay, or a packet loss rate (PLR) of the multimedia traffic for the first window of one or more frames, or during the first time period.

25. The apparatus of claim 22, wherein the content scenario detection unit is to detect the first bitrate scenario based on a transmitter bitrate of the transmitter to measure a bitrate of the multimedia traffic transmitted by the transmitter for the first window of one or more frames, or during the first time period, and a network efficiency defined as a ratio between a receiving bitrate and the transmitter bitrate, wherein the receiving bitrate is to measure a bitrate received by a receiver during the first window of one or more frames or during the first time period.

* * * * *